(12) United States Patent
Blackburn (10) Patent No.: US 11,288,979 B1
(45) Date of Patent: Mar. 29, 2022

(54) STETHOSCOPE TRAINING DEVICES AND METHODS

(71) Applicant: John J. Blackburn, Troy, NY (US)

(72) Inventor: John J. Blackburn, Troy, NY (US)

( * ) Notice: Subject to any disclaimer, the term of this patent is extended or adjusted under 35 U.S.C. 154(b) by 620 days.

(21) Appl. No.: 14/992,375

(22) Filed: Jan. 11, 2016

(51) Int. Cl.
*G09B 23/28* (2006.01)

(52) U.S. Cl.
CPC .................................... *G09B 23/28* (2013.01)

(58) Field of Classification Search
CPC .... G09B 23/28; G09B 23/281; G09B 23/283; G09B 23/285; G09B 23/388; G09B 23/30; G09B 23/303; G09B 23/306; G09B 23/32; G09B 23/34; H04R 1/1016; A61B 7/02
USPC ......................................................... 434/266
See application file for complete search history.

(56) References Cited

U.S. PATENT DOCUMENTS

| | | | | |
|---|---|---|---|---|
| 4,282,678 A * | 8/1981 | Tsui | ................... | A63H 33/3094 446/193 |
| 4,295,475 A * | 10/1981 | Torzala | ............... | A61B 5/14552 600/549 |
| 6,220,866 B1 * | 4/2001 | Amend | .................. | G09B 23/28 381/67 |
| 9,552,745 B1 * | 1/2017 | Gutierrez Morales | ...................... | G09B 23/28 |
| 9,723,997 B1 * | 8/2017 | Lamego | ............. | A61B 5/14551 |
| 2004/0228494 A1 * | 11/2004 | Smith | ...................... | A61B 7/04 381/67 |
| 2008/0232604 A1 * | 9/2008 | Dufresne | ............... | A61B 5/061 381/67 |
| 2013/0196302 A1 * | 8/2013 | Lecat | ..................... | G09B 23/28 434/266 |
| 2013/0252219 A1 * | 9/2013 | Lecat | ..................... | G09B 23/28 434/266 |
| 2014/0302473 A1 * | 10/2014 | Nakaguchi | ........... | G09B 23/285 434/262 |
| 2018/0364095 A1 * | 12/2018 | Nagaya | ................... | G01S 17/08 |

\* cited by examiner

*Primary Examiner* — Peter R Egloff
(74) *Attorney, Agent, or Firm* — Tech Valley Patent, LLC; John Pietrangelo (57) ABSTRACT

Stethoscope training devices and methods are provided. The devices and methods train healthcare providers in the proper use of a stethoscope and the proper interpretation of the sounds heard with a stethoscope. The device includes a housing adapted for use by a trainee to contact a surface, for example, the surface of the body of manikin, and a sensor mounted in the housing and configured to detect approach or contact of the surface by the housing. The housing may typically mimic the appearance of a stethoscope chest piece. The sensor may be a light sensor, for example, a light sensor configured to detect a predetermined light intensity. The device may include a transmitter, for example, a speaker for transmitting predetermined sounds of bodily organs, such as, heartbeats or breathing. The transmitter may be activated only upon contact or proximity of the housing with a surface as indicated by the sensor.

24 Claims, 4 Drawing Sheets

STETHOSCOPE TRAINING DEVICES AND METHODS

BACKGROUND OF THE INVENTION

Technical Field

The invention generally relates to stethoscope training devices and methods in the field generally know as auscultation. More particularly, aspects of the invention are related to stethoscope training devices and methods using instrumented stethoscope head pieces adapted to sense surfaces and transmit audio signals corresponding to internal organ functions.

Description of Related Art

Among the many skills required of an effective healthcare provider is the effective use of a stethoscope. In the medical field, the detection of internal bodily noises for diagnosing and treatment is referred to as auscultation. The common stethoscope is one mode of auscultation that is broadly used by physicians, nurses, and other healthcare professionals to aid in the detection of maladies in their patents. However, the proper use of a stethoscope and the accurate detection and interpretation of internal bodily sounds is a skill only gained by practice.

Accordingly, various attempts have been made in the art to provide healthcare professionals and others with devices and methods for practicing, developing, and otherwise training to perfect their skill in use of a stethoscope and the accurate interpretation of the sounds detected. Some of the various existing methods and devices that have been provided are disclosed in U.S. Pat. No. 7,645,141 of Lecat; U.S. Pat. No. 8,882,511 of Mackenzie, et al.; U.S. Patent Publication 2013/0252219 of Lecat; and U.S. Patent Publication 2014/0087343 of Lecat, among others.

However, despite these advances, a need exists in the art to provide more effective methods and devices for training healthcare professionals and others in the proper use of a stethoscope.

SUMMARY OF THE INVENTION

In response to the need identified above, devices and methods have been conceived and developed to assist the healthcare provider and others in the proper use of a stethoscope. These devices and methods are characterized by the use of specially designed and instrumented stethoscope head pieces (also known as, chest pieces) having one or more sensors adapted to detect the proximity or contact with a patient or a patient manikin. These head pieces may also include one or more transmitters adapted to emit predetermined audible signals, for example, sounds, corresponding to known bodily conditions.

Accordingly, one embodiment of the invention is a stethoscope training device comprising or including: a housing adapted for use by a trainee to contact a surface; and a sensor mounted in the housing and configured to detect approach or contact of the surface by the housing. In one aspect, the sensor comprises a light sensor, for example, a light sensor is adapted to detect a predetermined light intensity, for example, a variation from an initial light intensity. In another aspect, the device may include a transmitter adapted to emit a signal when the sensor detects approach or contact of the surface by the housing. The signal transmitted may be an electrical signal or an audible signal, for example, a bodily sound. In another aspect, the sensor may be a proximity sensor. In another aspect, the device may include an RFID interrogator. In one aspect, the housing mimics the appearance of a stethoscope chest piece.

Another embodiment of the invention is a stethoscope training method comprising or including: positioning a housing having a sensor configured to detect approach or contact of the housing with a surface adjacent the surface; using the sensor, detecting approach or contact with the surface; and when approach or contact is detected, activating a transmitter adapted to transmit a signal associated with an audible signal detectable by a trainee. In one aspect, activating the transmitter comprises emitting one of an electrical signal and an audible signal. The audible signal may be a bodily sound. The method may also include detecting an RFID tag; and identifying an audible signal associated with the RFID tag. In one aspect, the method further comprises preloading a signal corresponding to the audible signal on a storage medium in the housing, for example, wirelessly preloading the signal.

A further embodiment of the invention is a stethoscope training device comprising or including: a housing adapted for use by a trainee to approach or contact a surface; a sensor mounted in the housing and configured to detect approach or contact of the surface by the housing; and a transmitter mounted in the housing and configured to substantially continuously transmit a signal corresponding to a predetermined audible signal, and when the sensor detects approach or contact of the surface by the housing, varying the volume of the predetermined audio signal. In one aspect, varying the volume of the predetermined audible signal may comprise increasing the volume, for example, increasing the volume as a function of a proximity to the surface. In one aspect, the signal substantially continuously transmitted may be an electrical signal or an audible signal. In one aspect, the housing mimics the appearance of a stethoscope chest piece.

Another embodiment of the invention is a stethoscope training method comprising or including: positioning a housing having a sensor adapted to detect approach or contact a surface adjacent the surface; substantially continuously transmitting a signal corresponding to a predetermined audible signal; using the sensor, detecting approach or contact of the surface by the housing; and when approach or contact of the surface is detected, varying a volume of the predetermined audible signal. In one aspect, varying the volume of the predetermined audible signal may be increasing the volume, for example, increasing the volume as a function of a proximity to the surface. In one aspect, the method may further comprise detecting an RFID tag; and identifying an audible signal associated with the RFID tag.

These and other aspects, features, and advantages of this invention will become apparent from the following detailed description of the various aspects of the invention taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed descriptions of aspects of the invention taken in conjunction with the accompanying drawings in which:

DETAILED DESCRIPTION OF THE INVENTION

Certain embodiments commensurate in scope with the claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figures 1, 2:
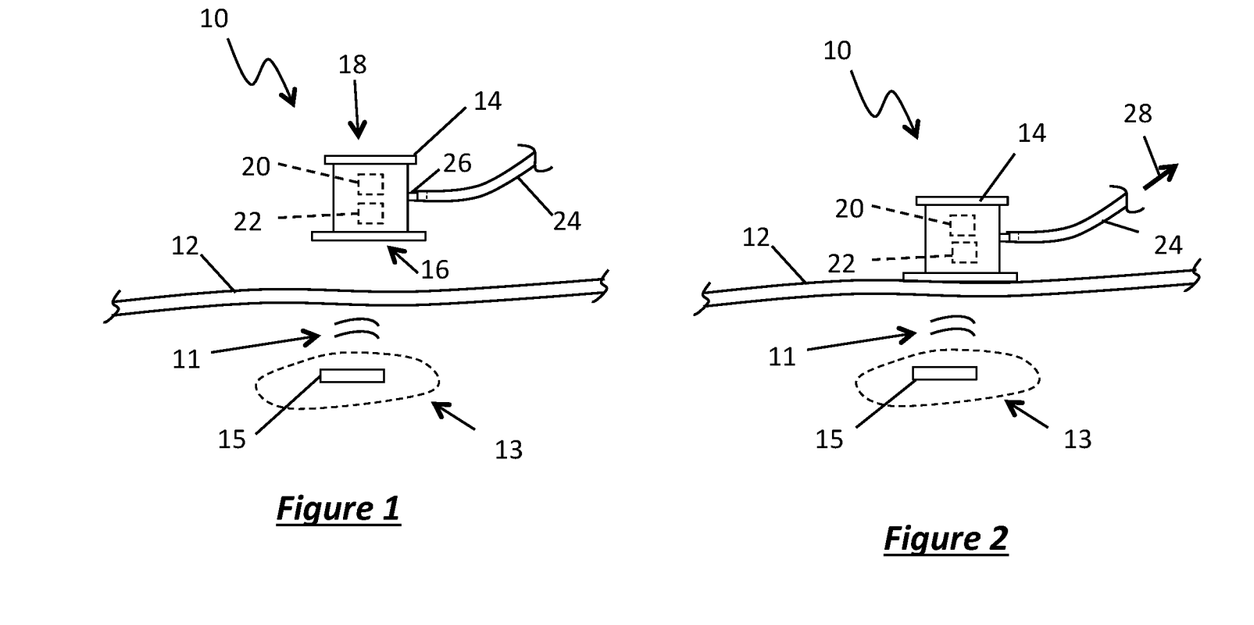
FIG. 1 is a schematic side elevation view of a stethoscope training device prior to contacting a surface according to one aspect of the invention.
FIG. 2 is schematic side elevation view of the stethoscope training device shown in FIG. 1 after contacting a surface according to one aspect of the invention.

With the above in mind, FIG. 1 is a schematic side elevation view of a stethoscope training device 10 prior to contacting a surface 12 according to one aspect of the invention. As illustrated in FIG. 1, device 10 may be used to simulate the detection of audible signals 11 emanating from beneath surface 12, for example, emanating from an organ 13, such as, as lung or heart, of an actual or simulated patient. It will be understood that organ 13 (shown in phantom) is provided for illustrative purposes only, since aspects of the invention are intended to simulate the audible signals 11 where no organ 13 may typically be present.

In one aspect of the invention, stethoscope training device 10 is adapted to detect a transponder or "tag" 15 located on or beneath surface 12, for example, tag 15 may be a radio frequency identification (RFID) tag positioned below surface 12 or a tag detectable by other wireless protocols, such as, near field communication (NFC) or Bluetooth, among others. In one aspect, tag 15 may be any wirelessly detectable device containing at least some data that can be at least detected by a receiver, for example, at least some data associated with a predetermined audible signal. In one aspect, tag 15 may contain data that can be read by a receiver, for example, an interrogator or reader associated with device 10, for example, at least some of the data may be associated with a predetermined audible signal. In another aspect, tag 15 may comprise a magnetic device or a device producing a magnetic field, and device 10 may adapted to detect the magnetic device and/or magnetic field, and the magnetic device and/or magnetic field may be associated with a predetermined audible signal. As is common for all the aspects of the invention disclosed herein, the predetermined audible signal may be stored and retrievable, for example, preloaded on a storage medium located in device 10 or remote from device 10.

According to aspects of the invention, device 10 may comprise a housing 14 having any shape and size adapted to provide the function disclosed herein. However, in one aspect, housing 14 may be designed and shaped to mimic the appearance of a stethoscope "chest piece" or "head," for example, having a "diaphragm" end 16 and a "bell" end 18. According to aspects of the invention, device 10 includes at least one sensor 20, adapted to detect the proximity or contact of device 10 with surface 12, as will as discussed further below. In one aspect, device 10 may also include at least one transmitter 22, adapted to function as discussed below.

In one aspect, device 10 includes one or more one waveguides, conduits, or tubes 24 coupled to housing 14 and also coupled to a headset (not shown). The headset may be a conventional stethoscope headset and be adapted to be worn by a trainee, for example, a conventional stethoscope headset having conventional "ear tubes" and "ear tips," as known in the art. Tube 24 may be coupled by conventional means to housing 14, for example, by engaging a hollow, cylindrical stem 26 projecting from housing 14, for instance, a stem having projections or barbs adapted to engage and retain tube 24.

According to aspects of the invention, surface 12 may comprise a broad range of surfaces, for example, the surface of the body of a patient, human patient (live or deceased) or an animal patient (live or deceased); the surface of a training manikin (human or animal); or even the surface of a wall or table, among others. In another aspect, the surface may comprise the surface of a garment, for example, of a shirt or pair of pants, for example, a garment worn by a human patient, animal patient, or manikin. The garment may include one or more detection objects, such as, tags 15, for example, tags 15 on the surface of the garment or embedded in the garment. As will become apparent upon review of aspects of the invention, surface 12 may be any surface providing an interaction with sensor 20 to provide the benefits of aspects of the invention.

FIG. 2 is schematic side elevation view of a stethoscope training device 10 shown in FIG. 1 after contacting surface 12 according to one aspect of the invention. As shown in FIG. 2, according to aspects of the invention, upon contacting housing 14 with surface 12, or where housing 14 is in close proximity with surface 12, sensor 20 detects the presence of surface 12 and permits the activation of transmitter 22. In one aspect, transmitter 22 may be described as being "triggered" by sensor 20 whereby transmitter 22 is activated when sensor 20 detects the presence or proximity of surface 12. For example, in one aspect, when sensor 20 detects the presence or proximity of surface 12, transmitter 22 emits an audible signal from device 10 which can be detected by a trainee. For instance, in one aspect, transmitter 22 may emit a pre-programmed audible signal, such as, the sound of a human heart murmur, via tubing 24, as indicated by arrow 28.

In another aspect, transmitter 22 may be described as being "interlocked" with sensor 20 whereby transmitter 22 cannot activate until sensor 20 detects the presence or proximity of surface 12. For example, in one aspect, when sensor 20 detects the presence or proximity of surface 12, transmitter 22 is permitted to emit an audible signal from device 10 which can be detected by a trainee. For instance, in one aspect, transmitter 22 may emit a pre-programmed audible signal, such as, the sound of a human heart murmur, via tubing 24, as indicated by arrow 28.

According to aspects of the invention, proximity with surface 12 may be within 3 inches or less of surface 12, or within 2 inches or less of surface 12, or within 1 inch or less of surface 12, or within 0.5 inch or less of surface 12.

According to aspects of the invention, sensor 20 may be any sensor capable of detecting the contact of housing 14 with surface 12 or the close proximity of housing 14 to surface 12. In one aspect, sensor 20 may be a sensor adapted to detect electromagnetic radiation, for example, visible light and/or thermal radiation and/or a magnetic field. In other aspects of the invention, sensor 20 may comprise a proximity sensor, for example, a sensor adapted to detect the presence of surface 12 with or without contact with surface 12. Sensor 20 may comprise a capacitive proximity sensor, for example, a sensor adapted to detect the capacitance of surface 12. In another aspect, sensor 12 may be physical contact sensor, for example, a sensor having a deflectable activator that deflects upon contact with surface 12. In other aspect, sensor 20 may comprise a magnetic field detecting sensor, an accelerometer, and/or a gyroscope. Other sensors that may be used for sensor 20 will be apparent to those of skill in the art, and are included within the scope of aspects of the present invention.

As noted, in one aspect, sensor 20 may comprise a light sensor, for example, a sensor adapted to detect light visible to the human eye, though aspects of the invention are not limited to radiation being visible to the human eye. According to this aspect, sensor 20 may be adapted to detect the absence of or reduction in the intensity of the ambient visual light. Specifically, according to one aspect, sensor 20 may be adapted to detect the variation of the visible light when a surface of device 10, for example, the surface of diaphragm side 16, approaches or contacts surface 12 whereby the intensity of the electromagnetic radiation, for example, the intensity of the ambient visible light, diminishes below a predetermined threshold, and thus indicates proximity and/or contact with surface 12.

As noted, in one aspect, sensor 20 may comprise a light sensor, for example, a sensor adapted to detect light visible to the human eye, though aspects of the invention are not limited to radiation being visible to the human eye. According to this aspect, sensor 20 may be adapted to detect the absence of or reduction in the intensity of the ambient visual light. Specifically, according to one aspect, sensor 20 may be adapted to detect the variation of the visible light when a surface of device 10, for example, the surface of diaphragm side 26, approaches or contacts surface 12 whereby the intensity of the electromagnetic radiation, for example, the intensity of the ambient visible light, diminishes below a predetermined threshold, and thus indicates proximity and/or contact with surface 12.

In one aspect, the predetermined threshold may be a variation in light detected, for example, a variation in the ambient light detected, or a detection of an absolute intensity of the light detected. For example, in one aspect, the threshold may comprise a variation or deviation from an initial light intensity detected, for example, a percent variation in the light intensity detected. In one aspect, an initial light intensity may be detected by sensor 20, for example, a photodiode, and the subsequent light intensity monitored for variations or deviations from the initial intensity. In one aspect, the predetermined threshold may comprise an absolute or a relative percent deviation from the initial intensity. For example, an absolute change of predetermined candelas, or similar light intensity units, or the relative percent deviation may be at least a 50% change from the initial intensity. In one aspect, the predetermined threshold indicating proximity or contact with surface 12 may be 80% change from the initial intensity, or 90% change from the initial intensity, or 95% change from the initial intensity. It is envisioned that the predetermined threshold may vary dependent upon the availability, source, and/or intensity of the ambient light, among other things.

It will be understood by those in the art that the intensity of the ambient light and its variation may be expressed in various conventional light intensity units, including watts per steradian, lumens per steradian (or candela), or watts per square meter, among others.

In one aspect of the invention, sensor 20 may be a photo sensor or a photo detector, such as, a photodiode light sensor, though other types of light sensors may be used, for example, a charge coupled device (CCD) or photo-sensing light emitting diodes (LEDs), among others.

According to one aspect of the invention, a light source may be provided to at least partially provide ambient illumination to the examination room, for example, to the surface 12. In one aspect, the variation in this ambient illumination by can be detected by light sensor 20.

In another aspect, a sensor 20 may comprise an interrogator or reader adapted to detect tag 15 and/or receive at least some data stored on tag 15. In one aspect, sensor 20 may be an interrogator or reader of tag 15 in lieu of a detector of surface 12, as described above, or sensor 20 may be a combination of a detector of surface 12 and an interrogator of tag 15. For example, sensor 20 may provide both detection of surface 12 and detection and/or reading of tag 15, or sensor 20 may comprise two or more sensors, one providing detection of surface 12 and another providing detection and/or interrogation of tag 15. In one aspect, data on tag 15 may be associated with a predetermined audible signal, for example, the data on tag 15 may be associated with retrievable audible signal file stored locally, for example, in or on housing 14, or stored remotely for example, in a remote computer, for instance, in a file accessible over the Internet, that is, a file "linked" to the data on tag 15. In one aspect, the retrievable audible signal file may be locally or remotely retrieved, loaded on a local storage device or medium, such as, a storage device positioned in housing 14, and transmitted by transmitter 22. As is for all the aspects of the invention disclosed herein, the predetermined audible signal may be stored and retrievable, for example, preloaded on a storage medium located in device 10, for instance in housing 14 or remote from housing 14.

Transmitter 22 may be any device adapted to emit an audible signal that can be detected by a human trainee. For example, in one aspect, transmitter 22 may be "speaker" adapted to emit an audible signal, for example, an audible signal that can pass through tube 24 and heard by a trainee, for example, a trainee wearing a headset coupled to tube 24. In another aspect, transmitter 22 may be a transmitter adapted to emit an electrical signal to an external transducer, such as, a speaker, for example, one or more speakers located in ear tubes or ear tips coupled to tube 24. In this aspect, the electrical signal emitted by transmitter 22 to the external speaker may be a wired signal (for example, carried over a wire directed through tube 24) or a wireless signal detectable by the external speaker.

In one aspect, the signal transmitted by transmitter 22 may be a pre-determined audible signals (for example, sounds) previously stored for subsequent transmission by transmitter 22. In one aspect, the pre-determined audible signals may be digitally stored in or on housing 14 (for example, stored on a storage device or medium in housing 14) for local access, retrieval, and transmission by transmitter 22. In another aspect, the pre-determined audible signals may be digitally stored remotely from housing 14 for remote access, retrieval, and transmission by a remote transmitter or local transmitter 22.

In another aspect, the signal transmitted by transmitter 22 may be generated, for example, dynamically generated, by software installed on one or processors provided in or on housing 14, or remote from housing 14. For example, the signal transmitted by transmitter 22 may be generated in response to a sensor 20 or any other sensor provided. For example, the signal transmitted by transmitter 22 may be generated in response to tag 15, the location of tag 15, or the data received from tag 15 sensed by a sensor. For instance, according to one aspect of the invention, a heart beat of a specific amplitude, frequency, or variation, among other characteristics, may be generated by aspects of the invention in response to positioning housing 14 in proximity to or in contact with a surface positioned over the human heart, for example, as determined by a tag 15 embedded below the surface 12. Other signals corresponding to bodily sounds may also be generated by software in communication with transmitter 22, for example, within or on housing 14 or remote from housing 14.

It is envisioned that the audible sounds transmitted by transmitter 22, either audibly or electronically, may comprise any sound that a trainer may want a stethoscope trainee to hear during training. These sounds may be recordings of naturally-occurring sounds or sounds at least partially digitally manipulated or entirely digitally created. These sounds may typically be predetermined and stored (digitally or analog) and accessible (wirelessly or by wire) for subsequent retrieval and transmission. These sounds may be the sounds typically emitted by any internal human or animal organ or structure, and/or any sound emitted by a diseased or compromised internal human or animal organ or structure. For example, typical sounds may include, but are not limited to, normal or abnormal breathing sounds, normal or abnormal heart beating sounds, normal or abnormal bowel movement sounds, and normal or abnormal blood flow sounds, among others.

In addition to bodily function sounds, the one or more of transmitters 22 may emit audible messages to the user. For example, in one aspect, transmitter 22 may emit an audible signal indicating a characteristic of device 10 or a characteristic of the surface 12, and/or a characteristic of the tag 15. For example, transmitter 22 may emit an audible signal corresponding to the status or operation of device 10, such as, whether device 10 is energized, the state of the battery charge, or whether a fault or malfunction of device 10 has occurred. Transmitter 22 may emit an audible signal corresponding to the proximity of surface 12 or whether housing 14 has contacted surface 12. Transmitter 22 may emit an audible signal corresponding to the proximity or detection of tag 15 or the nature of tag 15, for example, corresponding to the organ tag 15 represents. These audible signals may comprise "beeps" or tones or audible messages, such as, "low battery" or "spleen detected." In one aspect, transmitter 22 may emit an audible signal corresponding to the detection of wireless communication devices, such as, Bluetooth enabled devices, or a magnetic detection method.

In one aspect, the audible sound may be stored on device 10, for example, preloaded on device 10, for instance, wirelessly preloaded or preloaded via one or more wires or cables. In another aspect, the audible sounds may be uploadable from a local or remote storage device prior to transmission, for example, wirelessly (for example, via a radio signal or a Bluetooth connection) or by one or more wires. In one aspect, the audible sounds may be uploaded after proximity or contact with surface 15 is detected.

In one aspect, transmitter 22 may emit a visually detectable signal in addition to or in lieu of an audible signal. For example, in one aspect, a second transmitter, different from transmitter 22, may be provided to provide a visual signal, for instance, a color-coded signal. In one aspect, transmitter 22 or a separate transmitter may comprise one or more light emitting diodes (LEDs) or other light-emitting devices. In one aspect, transmitter 22 may emit a visually detectable signal indicating a characteristic of device 10 or a characteristic of the surface 12, and/or a characteristic of the tag 15. For example, transmitter 22 may emit a visual signal corresponding to the status or operation of device 10, such as, whether device 10 is energized, the state of the battery charge, or whether a fault or malfunction of device 10 has occurred. Transmitter 22 may emit a visual signal corresponding to the proximity of surface 12 or whether housing 14 has contacted surface 12. Transmitter 22 may emit a visual signal corresponding to the detection of tag 12 or the nature of tag 12, for example, corresponding to the organ tag 15 represents. These visual signals may be distinguished by variations in color and frequency (for example, number or duration of flashes.) In one aspect, transmitter 22 may emit visual signals corresponding to the detection of wireless communication devices, such as, Bluetooth enabled devices, or a magnetic detection method.

Sensor 20 and transmitter 22 may typically be coupled, for example, eclectically coupled, so that signals can be transmitted to and/or from sensor 20 and transmitter 22. In one aspect, sensor 20 and transmitter 22 may be discrete devices wirelessly coupled or coupled by one or more wires or conductors. In another aspect, sensor 20 and transmitter 22 may be discrete devices on a single component, for example, discrete devices on a printed circuit board (PCB) or fabricated into a semiconductor device by lithographic methods. As is typical in the art, the PCB board may be provided with one or more processors (with appropriate software), one or more storage media, one or more input/output devices, or one or more user interfaces, among other conventional electronic components and devices.

In one aspect, device 10, sensor 20, and/or transmitter 22 may be programmable, for example, remotely programmable either wirelessly or via one or more wires. In one aspect, the programming may be downloaded or updated magnetically, for example, using one or more magnetic switches.

Figure 3:
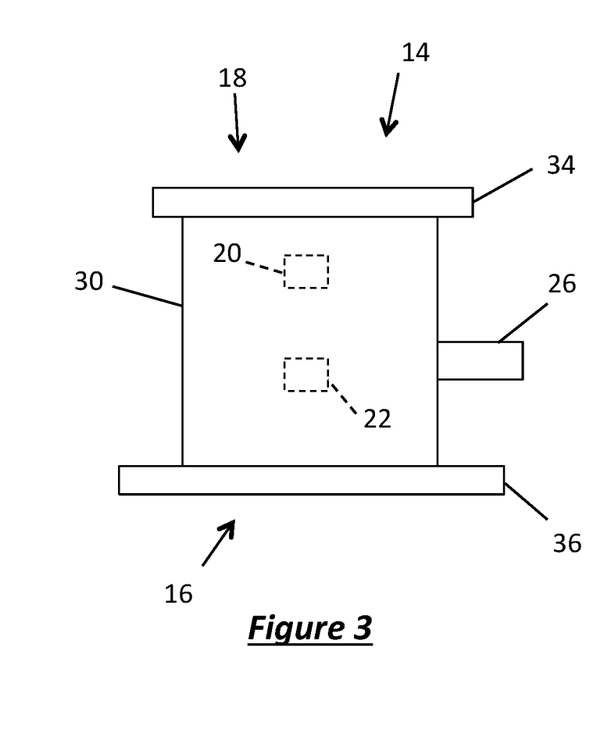
FIG. 3 is a schematic side elevation view of the stethoscope training device housing shown in FIGS. 1 and 2 according to one aspect of the invention.
Figure 4:
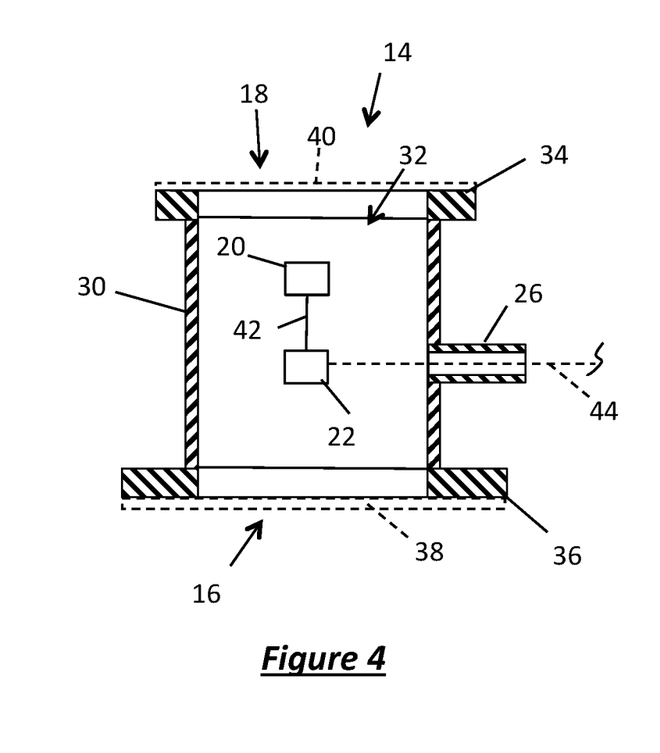
FIG. 4 is a cross-sectional view of the stethoscope training device housing shown in FIG. 3.

FIG. 3 is a schematic side elevation view of stethoscope training device housing 14 shown in FIGS. 1 and 2 according to one aspect of the invention. FIG. 4 is a cross-sectional view of stethoscope training device housing 14 shown in FIG. 3. According to aspects of the invention, housing 14 is adapted to contain at least one sensor 20 and at least one transmitter 22, for example, one or more of the sensors 20 and/or transmitters 22 referenced above. As shown in FIGS. 3 and 4, housing 14 may typically be cylindrical, for example, circular cylindrical, having a circular cylindrical main body 30, though main body 30 may be non-circular cylindrical, for example, rectangular cylindrical, square cylindrical, conical cylindrical, or oval cylindrical, among other cylindrical shapes. In the aspect of the invention shown in FIGS. 3 and 4, main body 30 may be a hollow body, for example, having an internal cavity 32, though in other aspects of the invention main body 30 may be non-hollow or substantially solid, for example, having one or more passages or cavities, for example, for sensor 20 and/or transmitter 22 and/or electrical conduit, such as, wires. As also shown in FIGS. 3 and 4, housing 14 may include one or more stems 26, for example, one or more hollow stems, adapted to engage one or more tubes 24. Stem 26 may be mounted to main body 30 by conventional means, for example, by welding or by screw threads.

As is typical in the art, housing 14 may include a diaphragm end 16 and a bell end 18. As shown in FIGS. 3 and 4, housing 14 may typically include a first flange 34 mounted to the bell end 18 of main body 30 and a second flange 36 mounted to diaphragm end 16 of main body 30. Flanges 34 and 36 may be mounted to main body 30 by conventional means, for example, by welding, or flanges 34 and 36 and main body 30 may be fabricated as an integral component, for example, machined from bar stock or molded or cast to the desired shape, with or without machining. Housing 14, including main body 30 and flanges 34 and 36, and stem 26 may typically be metallic, for example, fabricated from steel, such as, stainless steel, for instance, 303, 304, or 316 stainless steel, or their equivalent.

As shown in phantom in FIG. 4, the open ends of housing 14 may include diaphragms. For instance, diaphragm end 16 may comprise an opening adapted to receive diaphragm 38 and bell end 18 may comprise an opening adapted to receive diaphragm 40. Diaphragms 38 and 40 may be mounted to housing 14 by conventional means, for example, by means of conventional "chill rings" (not shown) as known in the art. As is also known in the art, diaphragms 38 and 40 may comprise a thin sheet of flexible material, for example, a thin sheet of plastic, for instance, a then sheet of polyethylene (PE), polypropylene (PP); or polyester (PE), among other suitable plastics. Diaphragms 38 and 40 may have a thickness ranging from 0.001 to 0.025 inches, for example, about 0.004 inches.

As shown most clearly in FIG. 4, the one or more sensors 20 and the one or more transmitters 22 may be mounted within housing 14, for example, to an internal or external surface of cylindrical main body 30, flange 34, or flange 36. Sensor 20 and transmitter 22 may be mounted by conventional means, for example, with an adhesive, such as, an epoxy, or with mechanical fasteners. However, it is envisioned that the one or more sensors 20 and the one or more transmitters 22 may be mounted in or on housing 14 wherever convenient, and provide the desired detection and transmitting functions disclosed herein. For example, sensor 20 and transmitter 22 may be mounted within or upon flanges 34 and 36, for example, separately mounted on separate flanges. In one aspect, one or more recesses or cavities (not shown) in main body 30, flange 34, and/or flange 36 may be provided to position and/or retain sensor 20 and/or transmitter 22.

As shown in FIG. 4, wherever mounted in or upon housing 14, sensor 20 and transmitter 22 may electrically communicate with each other via one or more wires or conductors 42. Sensor 20 and transmitter 22 may also communicate with each other wirelessly, for example, using one or more conventional wireless protocols, such as, Bluetooth®, NFC, or their equivalent.

As also shown in FIG. 4, transmitter 22 may transmit an electrical signal, for example, corresponding to a desired audible signal or a control signal, via electrical conductor or wire 44 (shown in phantom). For example, wire 44 may pass through stem 26 and into tube 24 (not shown) and communicate with an external receiver or transducer, for example, a speaker mounted in the ear buds of the ear tips of a stethoscope (not shown). Also, transmitter 22 may also communicate wirelessly with an external receiver or transducer, for example, using one or more conventional wireless protocols, such as, Bluetooth®, NFC, or their equivalent.

Figure 5:
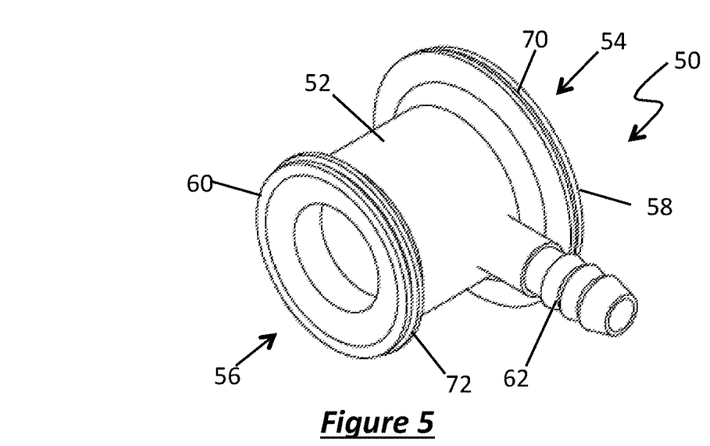
FIG. 5 is a right perspective view of a stethoscope training device housing according to another aspect of the invention.
Figure 6:
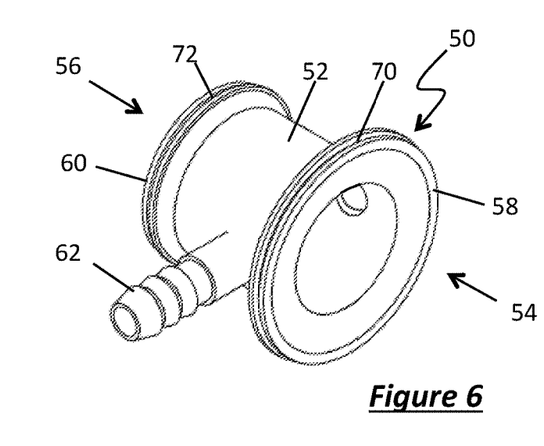
FIG. 6 is a left perspective view of the stethoscope training device housing shown in FIG. 5.
Figure 7:
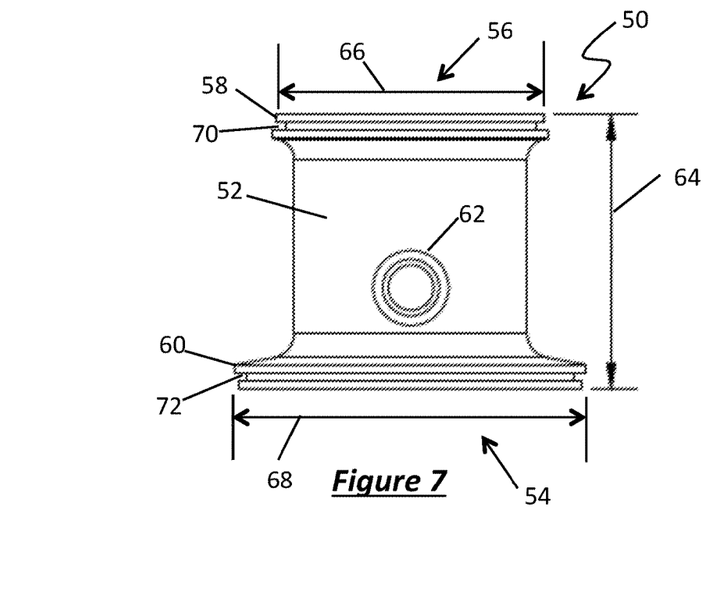
FIG. 7 is a front elevation view of the stethoscope training device housing shown in FIG. 5.
Figure 8:
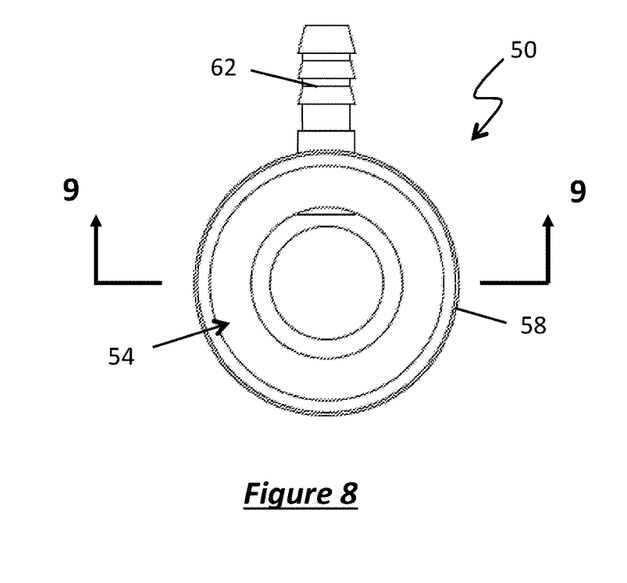
FIG. 8 is a top plan view of the stethoscope training device housing shown in FIG. 5.

FIG. 5 is a right perspective view of a stethoscope training device housing 50 according to another aspect of the invention. FIG. 6 is a left perspective view of stethoscope training device 50 housing shown in FIG. 5. FIG. 7 is a front elevation view of stethoscope training device housing 50 shown in FIG. 5 and FIG. 8 is a top plan view of stethoscope training device housing 50 shown in FIG. 5. Similar to housing 14 shown in and disclosed with respect to FIGS. 1 though 4, housing 50 shown in FIGS. 5-8, typically includes a main body 52, a diaphragm end 54, a bell end 56, a flange 58 at diaphragm end 54, a flange 60 at bell end 56, and a hollow stem 62 projecting from main body 6o. Though not shown in FIGS. 5-8, consistent with other aspects of the invention disclosed herein, housing 50 is adapted to receive and retain one or more sensors (not shown), such as, sensor 20, and/or one or more transmitters (not shown), such as, transmitter 22. Housing 50 may have all the attributes, including material attributes, of housing 30.

As shown in FIG. 7, housing 50 (and housing 30 disclosed above) may have a height 64 ranging from about 0.50 inches to about 12 inches, but typically has a height 64 between about 1 inch to about 2 inches, for example, about 1.375 inches. Housing 50 may have a width or diameter 66 at bell end 56 ranging from about 0.50 inches to about 12 inches, but typically has a width or diameter 66 between about 1 inch to about 2 inches, for example, about 1.335 inches. Housing 50 may have a width or diameter 68 at diaphragm end 54 ranging from about 0.50 inches to about 12 inches, but typically has a width or diameter 68 between about 1 inch to about 2 inches, for example, about 1.75 inches.

Figure 9:
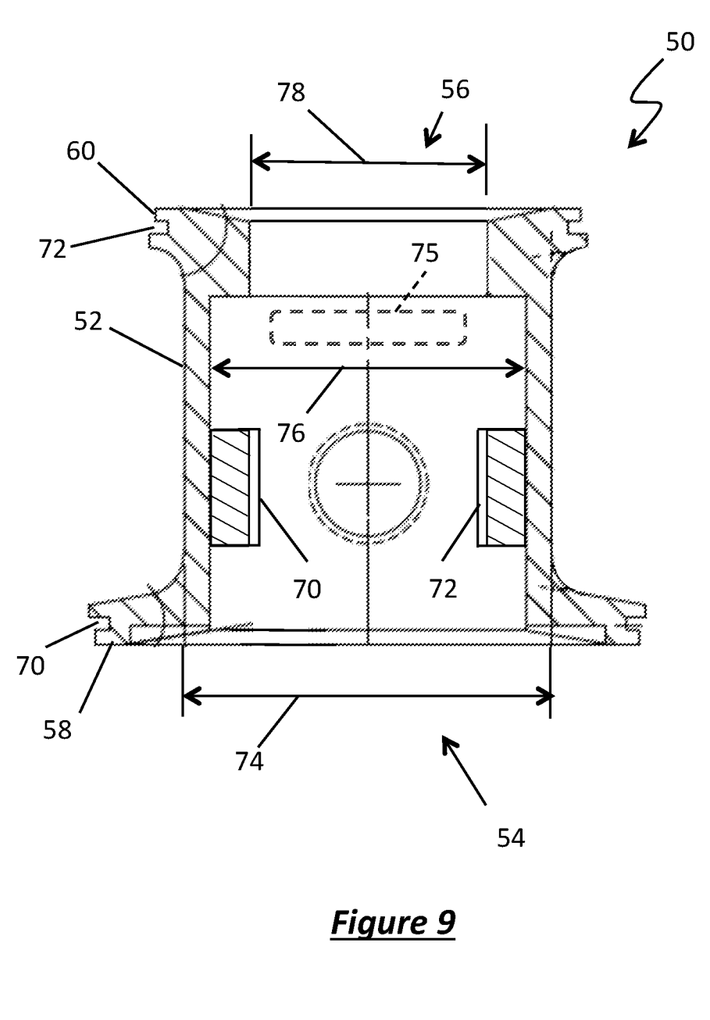
FIG. 9 is a cross-sectional view of the stethoscope training device housing shown in FIG. 8 as viewed along section lines 9-9 in FIG. 8.

FIG. 9 is a cross-sectional view of the stethoscope training device housing 50 shown in FIG. 8 as viewed along section lines 9-9 in FIG. 8. The cross section in FIG. 9 presents further alternative locations for the mounting of one or more sensors 70 (shown in cross section) and/or one or more transmitters 72 (shown in cross section) according to aspects of the invention. Sensor 70 may have all the attributes of sensor 20 disclosed herein, and transmitter 72 may have all the attributes of transmitter 22 disclosed herein. Though sensor 70 and transmitter 72 may be mounted separately within housing 50, as shown in FIG. 9, in one aspect, sensor 70 and transmitter 72 may be mounted on a common PCB board (not shown) within housing 50. As is typical in the art, the PCB board may be provided with one or more processors (with appropriate software), one or more storage media, one or more input/output devices, or one or more user interfaces, among other conventional electronic components and devices. In another aspect, one or more batteries 75 (shown in phantom) may be mounted within housing 50, and electrically coupled to sensor 70 and transmitter 72, as needed.

In addition, FIG. 9 illustrates some typical geometry of housing 50 according to one aspect of the invention. For example, housing 50 (and housing 30 disclosed above) may have a main body 52 having an outside diameter or outside width 74 ranging from about 0.50 inches to about 12 inches, but typically has an outside diameter or outside width 74 between about 1 inch to about 2 inches, for example, about 1.159 inches. Housing 50 may have a main body 52 having an insider diameter (or bore) or inside width 76 ranging from about 0.50 inches to about 12 inches, but typically has an inside diameter or inside width 76 between about 0.50 inches to about 2 inches, for example, about 1.10 inch. Flange 60 of housing 50 may have an insider diameter (or bore) or inside width 78 ranging from about 0.50 inches to about 12 inches, but typically has an inside diameter or inside width 78 between about 0.50 inches to about 2 inches, for example, about 0.75 inches.

Though in the depiction of housing 50 shown in FIGS. 5-9 housing 50 does not include a diaphragm, in one aspect of the invention, housing 50 may include at least one diaphragm extending across bell end 56 and/or across diagram end 54 as is conventional. The one or more diaphragms may have the same attributes of diaphragms 38 and 40 shown in and described with respect to FIGS. 3 and 4. For example, housing 50 shown in FIGS. 5-9, may include diaphragms retained by conventional chill rings, for example, elastic chill rings. As shown in FIGS. 5-9, flanges 58 and 60 may include annular recesses or grooves 70 and 72, respectively, positioned and sized to retain a chill ring adapted to retain a diaphragm.

The aspects of the invention shown in and described with respect to FIGS. 1-9 illustrate stethoscope training devices having housings 14, 50 having at least one sensor 20, 70 and possibly at least one transmitter 22, 72. As described above, these devices may be characterized as operating in response to the detection of a surface or at least a proximity to a surface, and possibly, the detection of a tag 15. In addition, the aspects shown in FIGS. 1-9 may also be used to effect another embodiment of the invention; specifically, a stethoscope training device having a housing, such as, housing 14 or housing 50, adapted for use by a trainee to contact a surface; and at least one transmitter mounted in the housing and configured to substantially continuously transmit a signal, for example, a signal corresponding to a predetermined audible signal when the device is electrically energized.

According to one aspect, the operation of the devices disclosed herein when energized, for example, the transmission of an audible signal, may be practiced with little or no input or influence of a human, for example without the actions or manipulations of a trainee, an instructor, or any other human present.

In one aspect, the device may comprise housing 14 or housing 50, and one or more transmitters 22 or 72. In one aspect transmitter 22 or 72 may have all the features and attributes of transmitter 22 or 72 described above, but also be configured to transmit a signal substantially continuously when the device is activated or energized, that is, when electric power is supplied to the device. For example, in one aspect, when energized transmitter 22 or 72 emits an audible signal, and continues to emit an audible signal, such as, the sound of a human heart beat. In this aspect, transmitter 22 or 72 may be a speaker. Also, the device may comprise housing 14 or housing 50, one or more transmitters 22 or 72, and one or more sensors 20 or 70, and be configured to transmit a signal substantially continuously when the device is activated or energized; however, the volume of the substantially continuous signal transmitted may vary in response to the detection of sensor 20 or 70. For example, the audible signal emitted by transmitter 22 or 72 with energization or activation may be substantially continuous, but the volume of the audible signal may vary, for example, increase in volume, as housing 14 or 50 approaches or contacts surface 12. In one aspect, the increase in volume may be practiced as a function of the proximity of the housing to surface 12, for instance, in linear relationship with the distance to the surface. For instance, this increase in volume mimics the increase in volume that would be expected as an actual stethoscope chest piece approaches and/or contacts the body of a patient.

In another aspect, transmitter 22 or 72 may have all the features and attributes of transmitter 22 or 72 described above, but also may be configured to transmit an electrical signal substantially continuously, either wirelessly or via one or more wires, to a remote or external transducer, for example, one or more speakers. The remote transducer may be positioned anywhere remote the housing 14 or 50, for example to a remote speaker positioned in the training room or theater. The remote transducer may be one or more speakers positioned in the tube 24, eartubes, or eartips of a stethoscope headset. For example, in one aspect, when energized, transmitter 22 or 72 emits an electrical signal, and continues to emit an electrical signal, such as, an electrical signal corresponding to the sound of human lungs.

According to one aspect, the substantially continuous operation feature of aspects of the invention may operate in response to the sensing of sensor 20 or 70 disclosed herein. For example, the substantially continuous operation may occur only when sensor 20 or 70 detects the proximity or contact with surface 12, for example, surface of a training manikin, among other surfaces.

It will be apparent to those in this field that aspects of the invention disclosed herein typically require some source of electrical power. Accordingly, it is envisioned that aspects of the invention may be powered by any conventional power source, for example, one or more batteries, available mains current, or even photovoltaics. In one aspect of the invention, one or more batteries are provided in housing 14 or 50. For example, housing 14 or 50 may include internal or external cavities adapted to receive one or more batteries, and one or more electrical wires or leads from the one or more batteries to sensor 20 or 70 and/or to transmitter 22 or 72. In one aspect, these batteries may provide a voltage ranging from about 3 volts DC to about 5 volts DC, and a current ranging from about 100 milliamps to about 500 milliamps.

In one aspect, the batteries used for aspects of the invention may be rechargeable batteries, for example, nickel-metal hydride (Ni-MH) batteries, or their equivalent. In one aspect, the rechargeable batteries may be recharged wirelessly, for example, via magnetic resonance or inductive power transfer (IPT), or via one or more wires. One rechargeable battery that may be used is one complying with the Qi interface standard developed by the Wireless Power Consortium, and provided by Motorola, Samsung, or Nokia, among others, or its equivalent.

In one aspect, the devices disclosed herein may be activated by means of a conventional switch, for example, a toggle or button mounted on housing 14 or 50. In one aspect, a magnetic switch, that is, a switch that responds to the presence, absence, or movement of a magnetic field, may practice activation of the devices disclosed herein. One magnetic switch that may be used for aspects of the invention is a magnetic switch provided by Standex-Meder Electronics, for example, model number MK24-A-2, or its equivalent.

With the assistance of FIGS. 1-9, one typical mode of operating aspects of the invention follows. First, device 10 may be assembled by attaching tube 24 to housing 14 or 50; for example, tube 24 may be coupled to a headset worn by the trainee. It is understood that housing 14 or 50 includes one or more sensors 20 or 70 and one or more transmitters 22 or 72. Prior to activating device 10, a manikin having an external surface 12, for example, a manikin of a torso, is positioned for access by device 10. For example, the manikin may be positioned on an examination table adjacent to device 10. If desired, a tag 15 may be positioned within the manikin beneath surface 12. If a tag 15 is used, the tag 15 may contain data associated with a predetermined audio file stored locally in housing 14 or 50 or remotely, for example, on a computer or server accessible via the internet. It is assumed that at least some level of ambient light is present and at least partially illuminates the room and the manikin. The trainee may then activate device 10, whereby sensor 20 or 70 and transmitter 22 or 72 may typically initialize, for example, the sensor 20 or 70 may detect an initial ambient light intensity for later reference.

Typically under the direction of an instructor, the trainee wearing the headset coupled to device 10 manually positions device 10 above the surface 12 of the manikin. According to aspects of the invention, transmitter 22 or 24 transmits little or no audible signals until the trainee locates device 10 at least in proximity to surface 12, for example, within 3 inches of surface 12. According to aspects of the invention, as trainee manually positions device 10 near or in contact with surface 12, and the ambient light detected by sensor 20 diminishes below a predetermined threshold, for example, at least 80% below the initial ambient light intensity, and device 10 activates transmitter 22 to, for example, emit an audible signal that is detectable by the trainee via tube 24. The audible signal may be preloaded on a storage device or medium in device 10, or may be downloaded from a local or remote storage device or medium. If a tag 15 is present, the one or more sensors 20 may also detect and read data from tag 15 which is associated with a specific predetermined audio file, for example, a heart beat, and the audible signal transmitted by transmitter 22 may be an audible heart beat.

When the trainee is instructed to position device 10 away from surface 12, the ambient light detected by sensor 20 will typically increase above the predetermined threshold, deactivating transmitter 22 so that the audible signal, for example, the heart beat, stops. According to aspects of the invention, this detection by sensor 20 and activation of transmitter 22 upon proximity or contact with surface 12 can assist the trainee in the proper use of a stethoscope and in the proper interpretation of the bodily sounds heard.

The applicant believes that it will be apparent from the above descriptions that novel devices and methods are provided for training healthcare practitioners and others in the proper use of a stethoscope and the accurate interpretation of the sounds heard. Aspects of the invention assist in the training of the use of a stethoscope (or other auscultation devices) that, in one aspect ensures that the stethoscope is in proper position where a bodily sound can be detected, that is, at least approximate the surface of the body or in contact with the body.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises," "comprising," "including," and/or "having" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical applications, and to enable others of ordinary skill in the art to understand the disclosure for various embodiments with various modifications as are suited to the particular use contemplated.

This written description uses examples to disclose the invention, including the best mode envisioned, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A stethoscope training device comprising:
a housing adapted for use by a trainee to contact a surface of a torso of a body of a patient or of a training manikin, the housing having a diaphragm end, a bell end opposite the diaphragm end, and a cylindrical stem projecting from the housing between the diaphragm end and the bell end, the cylindrical stem adapted to receive a stethoscope tube,
a sensor mounted in the housing, the sensor comprising a light sensor configured to detect a variation in the intensity of ambient light as the diaphragm end of the housing approaches or contacts the surface of the torso in a direction substantially normal to the surface of the torso, and
a transmitter adapted to emit an audible signal when the sensor mounted in the housing detects approach or contact of the surface of the torso by the diaphragm end of the housing.

2. The device as recited in claim 1, wherein the variation in ambient light intensity comprises a percentage of an initial ambient light intensity.

3. The device as recited in claim 1, wherein the audible signal comprises a bodily sound.

4. The device as recited in claim 1, wherein the device further comprises an RFID interrogator.

5. The device as recited in claim 1, wherein the housing mimics the appearance of a stethoscope chest piece.

6. The device as recited in claim 1, further comprising a storage medium in the housing, the storage medium adapted to receive the audible signal as a preloaded signal.

7. The device as recited in claim 2, wherein the percentage of the initial ambient light intensity comprises at least a 50% change in the initial ambient light intensity.

8. The device as recited in claim 7, wherein the percentage of the initial ambient light intensity comprises at least an 80% change in the initial ambient light intensity.

9. A stethoscope training device comprising:
- a housing adapted for use by a trainee to approach or contact a surface of a torso of a body of a patient or of a training manikin, the housing having a diaphragm end, a bell end opposite the diaphragm end, and a cylindrical stem projecting from the housing between the diaphragm end and the bell end, the cylindrical stem adapted to receive a stethoscope tube;
- a sensor mounted in the housing and configured to detect approach or contact of the surface of the torso by the diaphragm end of the housing in a direction substantially normal to the surface of the torso, wherein the sensor comprises a light sensor configured to detect a variation in the intensity of ambient light, and wherein the detection of approach or contact of the surface comprises the variation in the intensity of the ambient light; and
- a transmitter mounted in the housing and configured to transmit an audible signal corresponding to a predetermined audible signal, and, when the sensor detects approach or contact of the surface of the torso by the diaphragm end of the housing, the transmitter is configured to vary a volume of the audible signal corresponding to the predetermined audible signal.

10. The device as recited in claim 9, wherein configured to vary the volume of the predetermined audible signal comprises configured to increase the volume.

11. The device as recited in claim 10, wherein configured to increase the volume comprises increasing the volume as a function of a proximity to the surface.

12. The device as recited in claim 9, wherein the variation in the ambient light intensity comprises a percentage of an initial ambient light intensity.

13. The device as recited in claim 9, wherein the predetermined audible signal comprises a bodily sound.

14. The device as recited in claim 9, wherein the device further comprises an RFID interrogator.

15. The device as recited in claim 9, further comprising a storage medium in the housing, the storage medium adapted to receive the audible signal as a preloaded signal.

16. The device as recited in claim 12, wherein the percentage of the initial ambient light intensity comprises at least a 50% change in the initial ambient light intensity.

17. The device as recited in claim 16, wherein the percentage of the initial ambient light intensity comprises at least a 80% change in the initial ambient light intensity.

18. A stethoscope training method comprising:
- positioning a housing having a light sensor adapted to detect approach or contact adjacent a surface of a torso of a body of a patient or of a training manikin;
- transmitting an audible signal corresponding to a predetermined audible signal;
- using the sensor, detecting approach or contact of the surface of the torso by the housing in a direction substantially normal to the surface of the torso by detecting a variation in the intensity of ambient light; and
- when approach or contact of the surface of the torso is detected by detecting the variation in the intensity of ambient light, increasing a volume of the signal corresponding to the predetermined audible signal;
- wherein increasing the volume is practiced as a function of a proximity to the surface.

19. The method as recited in claim 18, wherein the variation in ambient light intensity comprises a percentage of an initial ambient light intensity.

20. The method as recited in claim 18, wherein the predetermined audible signal comprises a bodily sound.

21. The method as recited in claim 18, wherein the method further comprises detecting an RFID tag; and identifying an audible signal associated with the RFID tag.

22. The method as recited in claim 18, wherein the method further comprises preloading the signal corresponding to the audible signal on a storage medium in the housing.

23. The method as recited in claim 18, wherein the percentage of the initial ambient light intensity comprises at least a 50% change in the initial ambient light intensity.

24. The method as recited in claim 23, wherein the percentage of the initial ambient light intensity comprises at least a 80% change in the initial ambient light intensity.

* * * * *